US012243346B2

(12) United States Patent
Kim

(10) Patent No.: US 12,243,346 B2
(45) Date of Patent: Mar. 4, 2025

(54) ELECTRONIC DEVICE COMPRISING DISPLAY-EMBEDDED FINGERPRINT SENSOR AND METHOD

(71) Applicant: SAMSUNG ELECTRONICS CO., LTD., Suwon-si (KR)

(72) Inventor: Jinho Kim, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 18/489,017

(22) Filed: Oct. 18, 2023

(65) Prior Publication Data

US 2024/0046695 A1 Feb. 8, 2024

Related U.S. Application Data

(63) Continuation of application No. PCT/KR2022/006935, filed on May 13, 2022.

(30) Foreign Application Priority Data

May 13, 2021 (KR) .................. 10-2021-0062216

(51) Int. Cl.
*G06V 40/13* (2022.01)
*G06T 5/50* (2006.01)

(52) U.S. Cl.
CPC ............ *G06V 40/1318* (2022.01); *G06T 5/50* (2013.01); *G06T 2207/20224* (2013.01); *G06V 2201/121* (2022.01)

(58) Field of Classification Search
None
See application file for complete search history.

(56) References Cited

U.S. PATENT DOCUMENTS

2008/0253620 A1 10/2008 Hashimoto
2017/0220840 A1 8/2017 Wickboldt et al.
(Continued)

FOREIGN PATENT DOCUMENTS

CN 110520863 A 11/2019
CN 110945524 A 3/2020
(Continued)

OTHER PUBLICATIONS

International Search Report mailed Aug. 29, 2022 for PCT/KR2022/006935.

*Primary Examiner* — Joseph R Haley
(74) *Attorney, Agent, or Firm* — CANTOR COLBURN LLP

(57) ABSTRACT

An electronic device includes: a display panel including a plurality of light-emitting elements and a fingerprint sensing region; a fingerprint sensor disposed below the fingerprint sensing region; and at least one processor electrically connected to the display panel or the fingerprint sensor, and configured to identify an occurrence of an event that causes an operation of receiving a fingerprint through the fingerprint sensor to be executed, obtain a first image of the fingerprint by controlling the display panel such that light-emitting elements disposed in a first light-emitting region within the fingerprint sensing region output light, obtain a second image of the fingerprint by controlling the display panel such that light-emitting elements disposed in a second light-emitting region that does not overlap the first light-emitting region output light, and determine whether the fingerprint is a three-dimensional object, by using the first image and the second image.

16 Claims, 12 Drawing Sheets

(56) References Cited

U.S. PATENT DOCUMENTS

| | | | |
|---|---|---|---|
| 2017/0270342 A1 | 9/2017 | He et al. | |
| 2017/0323141 A1 | 11/2017 | Lee et al. | |
| 2018/0260602 A1 | 9/2018 | He et al. | |
| 2019/0303639 A1 | 10/2019 | He et al. | |
| 2020/0380238 A1 | 12/2020 | Zeng et al. | |
| 2020/0387687 A1* | 12/2020 | Chung | G06V 40/1335 |
| 2021/0004562 A1* | 1/2021 | Chiang | G06F 3/0421 |
| 2021/0064839 A1 | 3/2021 | Lee et al. | |
| 2021/0319207 A1 | 10/2021 | Zhong et al. | |
| 2021/0334568 A1* | 10/2021 | Hall | G06V 40/1388 |

FOREIGN PATENT DOCUMENTS

| | | | |
|---|---|---|---|
| CN | 111523523 A | 8/2020 | |
| CN | 111837131 A | 10/2020 | |
| CN | 211698979 U | 10/2020 | |
| JP | 4389957 B2 | 12/2009 | |
| JP | 6924767 B2 | 8/2021 | |
| KR | 20170125556 A | 11/2017 | |
| KR | 101924916 B1 | 12/2018 | |
| KR | 20210025752 A | 3/2021 | |
| WO | WO-2018171174 A1 * | 9/2018 | ....... G06K 19/06112 |

\* cited by examiner

ELECTRONIC DEVICE COMPRISING DISPLAY-EMBEDDED FINGERPRINT SENSOR AND METHOD

CROSS-REFERENCE TO RELATED APPLICATIONS

This application is a continuation application, claiming priority under § 365(c), of an International application No. PCT/KR2022/006935, filed on May 13, 2022, which is based on and claims the benefit of a Korean patent application number 10-2021-0062216, filed on May 13, 2021, in the Korean Intellectual Property Office, the disclosure of each of which is incorporated by reference herein in its entirety.

TECHNICAL FIELD

The disclosure relates to an electronic device including a display-embedded fingerprint sensor and a method thereof.

BACKGROUND ART

In order to increase a region for displaying a screen on a front side of an electronic device (for example, a mobile terminal), an area of a display disposed on the front side of the electronic device increases. As the area of the display increases, optical sensors disposed on edges of the display or disposed on a rear surface of the electronic device, such as an illuminance sensor, a camera module, or a fingerprint sensor, may be disposed adjacent to the display. Alternatively, as the area of the display of the electronic device increases, the electronic device may include a fingerprint sensor of an in-display type that is disposed on a rear surface of the display to recognize a user's fingerprint on a screen area of the front surface display.

In addition, as biometric data can be recognized through a biometric sensor such as a fingerprint sensor or an iris sensor thanks to the development of technology, the electronic device may include a biometric sensor and may recognize and store user's biometric data. Accordingly, the electronic device may protect personal information and may prevent other people than a registered user from illegally accessing the electronic device. For example, the electronic device may utilize a biometric authentication method to authenticate a user by comparing biometric data recognized through the biometric sensor and registered biometric data.

The electronic device may acquire a fingerprint image by considering a degree of reflection of light reflected on a ridge and a valley of a user's fingerprint by using an optical fingerprint sensor. In this case, there may be a difference in the amount of light reflected from the ridge and the valley of the user's fingerprint according to a degree of contact of the user's fingerprint in a fingerprint sensing region.

When biometric authentication is performed by using the optical fingerprint sensor, the electronic device may acquire a fingerprint image by considering a difference in the amount of light reflected from the ridge and the valley of the fingerprint which is recognized through the optical fingerprint sensor, and may perform biometric authentication by comparing the acquired fingerprint image and a fingerprint image that is pre-stored in the electronic device.

DISCLOSURE OF INVENTION

Technical Problem

When a two-dimensional (2D) fingerprint image of a user (e.g., two-dimensionally printed fingerprint image) other than a user's real fingerprint (e.g., three-dimensional fingerprint) is used in biometric authentication and the two-dimensional fingerprint image of the user includes regions having different degrees of reflection of light, biometric authentication may be performed even if the user's real fingerprint does not contact, and hence, there may be a security problem that the user's two-dimensional fingerprint image is illegally used by other people and is used as a biometric authentication means.

[Solution to Problem]

According to various embodiments of the disclosure, an electronic device includes: a display panel including a plurality of light-emitting elements and a fingerprint sensing region; a fingerprint sensor disposed below the fingerprint sensing region of the display panel; and at least one processor electrically connected with the display panel or the fingerprint sensor, and the at least one processor may be configured to: identify an occurrence of an event that causes an operation of receiving a fingerprint through the fingerprint sensor to be executed; acquire a first image of the fingerprint by controlling the display panel such that light-emitting elements disposed in a first light-emitting region within the fingerprint sensing region among the plurality of light-emitting elements output light; acquire a second image of the fingerprint by controlling the display panel such that light-emitting elements disposed in a second light-emitting region that does not overlap the first light-emitting region among the plurality of light-emitting elements output light; and determine whether the fingerprint is a three-dimensional object by using the first image and the second image.

According to various embodiments, an operating method of an electronic device including a display panel including a plurality of light-emitting elements and a fingerprint sensing region, and a fingerprint sensor includes: identifying an occurrence of an event that causes an operation of receiving a fingerprint through the fingerprint sensor to be executed; acquiring a first image of the fingerprint by controlling the display panel such that light-emitting elements disposed in a first light-emitting region within the fingerprint sensing region among the plurality of light-emitting elements output light; acquiring a second image of the fingerprint by controlling the display panel such that light-emitting elements disposed in a second light-emitting region that does not overlap the first light-emitting region among the plurality of light-emitting elements output light; and determining whether the fingerprint is a three-dimensional object by using the first image and the second image.

[Advantageous Effects of Invention]

According to an embodiment of the disclosure, when a biometric authentication procedure is performed by using an optical fingerprint sensor, a security problem that may be caused by other people illegally using a two-dimensional fingerprint image may be solved.

Various effects that are directly or indirectly understood through the disclosure may be provided.

MODE FOR CARRYING OUT THE INVENTION

Figure 1:
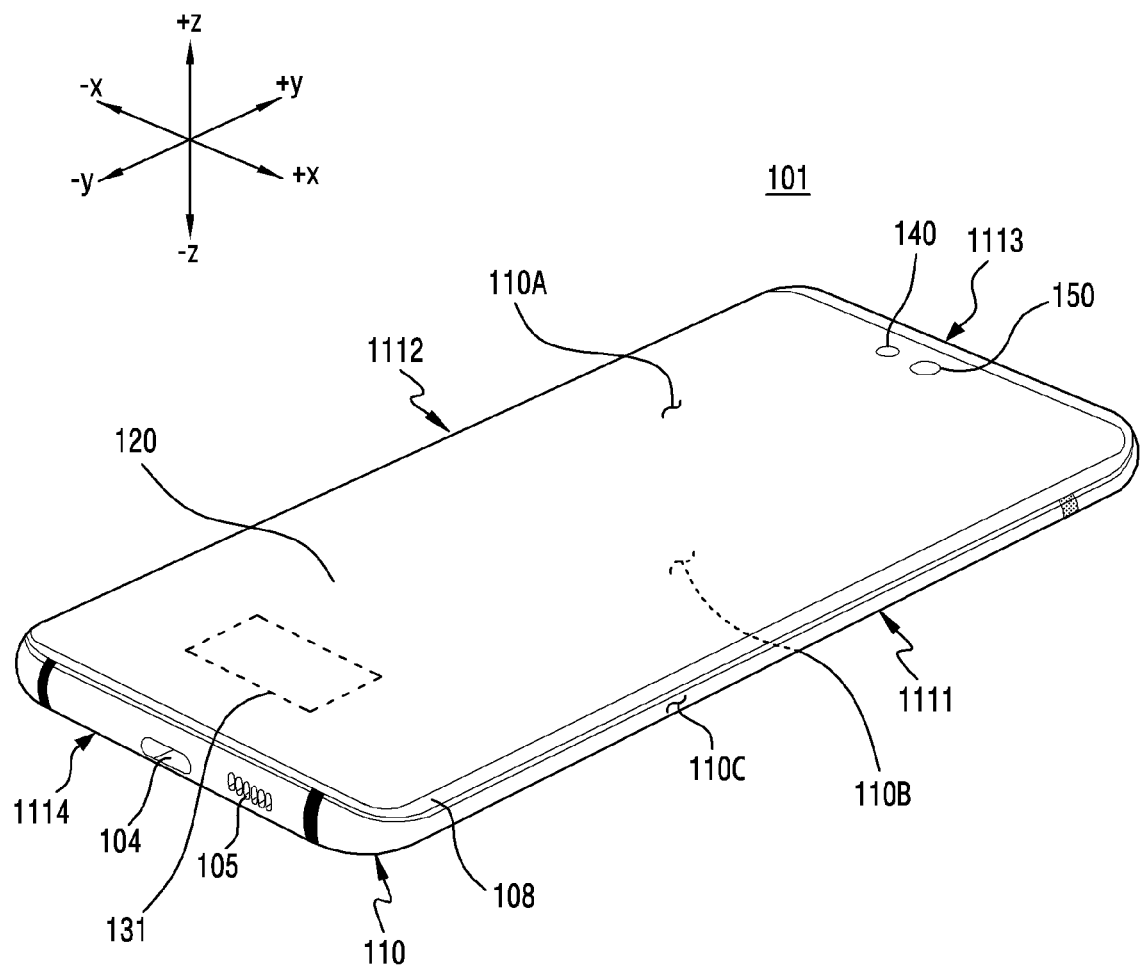
FIG. 1 is a view illustrating an electronic device according to an embodiment.

FIG. 1 is a perspective view of a front side of an electronic device 101 according to an embodiment.

The electronic device 101 of FIG. 1 may correspond to an electronic device 1101 of FIG. 11, which will be described below. For example, the electronic device 101 may include part or all of components constituting the electronic device 1101 of FIG. 11.

Referring to FIG. 1, the electronic device 101 according to an embodiment of the disclosure is an example of an electronic device of a bar type, but may be applied to other electronic devices such as a slidable electronic device, a rollable electronic device, and a foldable electronic device. The electronic device according to various embodiments disclosed herein may be devices of various types. For example, the electronic device may include a wearable device or a home appliance. The electronic device according to embodiments of the disclosure is not limited to the above-described devices.

Referring to FIG. 1, the electronic device 101 according to an embodiment may include a housing 110 which includes a first surface (or a front surface) 110A, a second surface (or a rear surface) 110B, and a side surface (or a sidewall) 110C surrounding a space between the first surface 110A and the second surface 110B. In another embodiment, the housing 110 may refer to a structure that forms a part of the first surface 110A, the second surface 110B, and the side surface 110C of FIG. 1.

According to an embodiment, the first surface 110A may be formed by a front surface plate 108 having at least part substantially transparent (for example, a glass plate including various coating layers, or a polymer plate). In an example, the front surface plate 108 may include a curved portion that is bent from the first surface 110A toward a rear surface plate 111 on at least a side edge portion and is seamlessly extended.

In an embodiment, the second surface 110B may be formed by a rear surface plate (not shown) which is substantially opaque. The rear surface plate may be formed by coated or colored glass, ceramic, a polymer, metal (for example, aluminum, stainless steel (STS), or magnesium), or a combination of at least two of the above-mentioned materials. In an example, the rear surface plate may include a curved portion that is bent from the second surface 110B toward the front surface plate 108 on at least a side edge portion and is seamlessly extended.

In an embodiment, the side surface 110C may be formed by a side surface member (or a side surface bezel structure or a sidewall) which is coupled with the front surface plate 108 and the rear surface plate (not shown) and includes metal and/or a polymer. In an example, the side surface 110C may include a first side surface 1111 which is positioned on a right side (for example, the +x direction of FIG. 1) of the electronic device 101 and is extended along a first direction (for example, the +y direction of FIG. 1), a second side surface 1112 which is parallel to the first side surface 1111 and is extended along the first direction, a third side surface 1113 which is extended along a second direction (for example, the +x direction of FIG. 1) perpendicular to the first direction and connects one end (for example, one end in the +y direction of FIG. 1) of the first side surface 1111 and one end (for example, one end in the +y direction of FIG. 1) of the second side surface 1112, and/or a fourth side surface 1114 which is parallel to the third side surface 1113 and connects the other end (for example, one end in the −y direction of FIG. 1) of the first side surface 1111 and the other end (for example, one end in the −y direction of FIG. 1) of the second side surface 1112.

According to an embodiment, the electronic device 101 may include at least one or more of a display panel 120, a connector hole 104, an audio module 105, an illuminance sensor 140, a camera module 150. In an example, the electronic device 101 may omit at least one of the components or may additionally include other components. For example, the electronic device 101 may further include a sensor module (not shown). The electronic device 101 may include a key input device (not shown).

In an embodiment, the display panel 120 may be exposed through a substantial portion of the front surface plate 108. In an example, the display panel 120 may be coupled with or may be disposed adjacent to a touch sensing circuit, a pressure sensor for measuring an intensity (pressure) of a touch, and/or a digitizer for detecting a stylus pen of a magnetic field method. In an example, an edge of the display panel 120 may be formed substantially the same as the shape of an adjacent exterior (for example, a curved surface) of the front surface plate 108.

In an embodiment, at least a certain region of the display panel 120 may be set as a fingerprint sensing region 131. Although FIG. 1 illustrates that one fingerprint sensing region 131 is set on the display panel 120, the technical idea of the disclosure is not limited thereto. For example, a plurality of fingerprint sensing regions 131 may be set on the display panel 120. The fingerprint sensing region 131 may have various surface areas and/or shapes. The fingerprint sensing region 131 may be directly displayed on the display panel 120 as a biometric authentication user interface (UI) in order to guide a user to the fingerprint sensing region 131.

Figure 2:
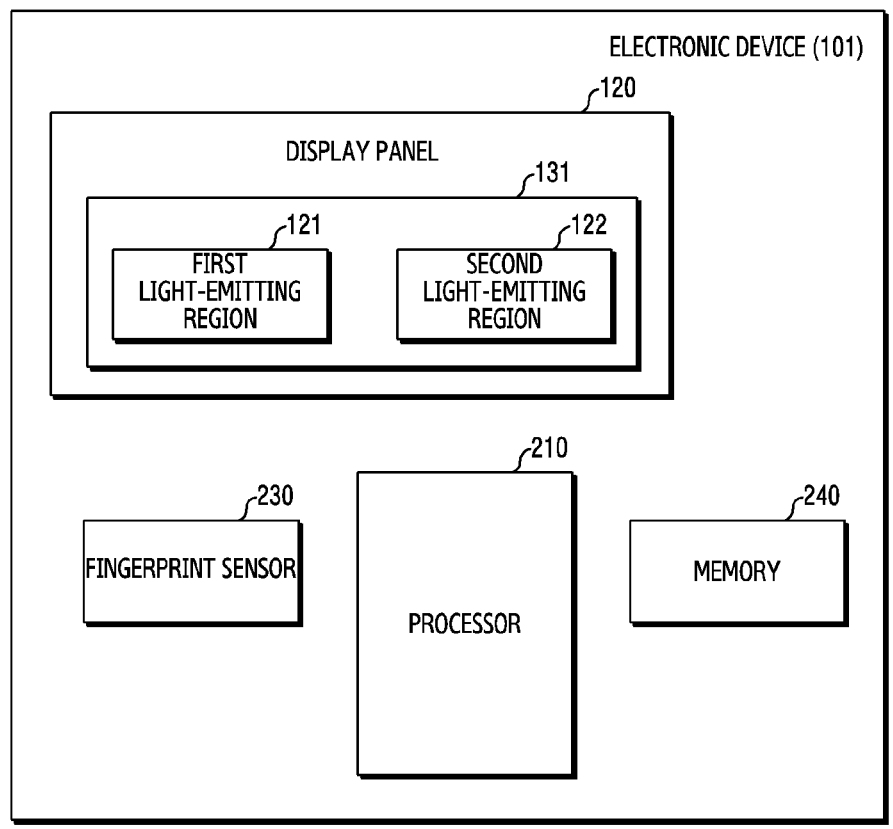
FIG. 2 is a block diagram of the electronic device according to an embodiment.

In an embodiment, the electronic device 101 may acquire fingerprint information of an external object, which is sensed through the fingerprint sensing region 131, through a fingerprint sensor (for example, a fingerprint sensor 230 of FIG. 2).

In an embodiment, the electronic device 101 may have the illuminance sensor 140 and/or the camera module 150 disposed in a region that overlaps at least a certain region of the display panel 120. The illuminance sensor 140 and/or the camera module 150 may be embedded in the display panel 120. In an embodiment, the illuminance sensor 140 may be disposed to overlap at least a certain region of the display panel 120 when the front surface of the housing 110 is viewed from above. The illuminance sensor 140 may be disposed on the rear surface (for example, the −z direction) of the display panel 120. In an example, the illuminance sensor 140 may be disposed adjacent to the camera module 150. FIG. 1 illustrates that the illuminance sensor 140 is disposed at a center of an upper portion of the display panel 120, but this should not be considered as limiting. For another example, the illuminance sensor 140 may be disposed on a right or left side of the upper portion of the display panel 120.

In an embodiment, the illuminance sensor 140 may measure external illuminance by using an intensity of light entering from the outside. The illuminance sensor 140 may receive external light to measure illuminance in an environment where the electronic device 101 is positioned.

In an embodiment, the camera module 150 may include a plurality of cameras. In an example, the camera module 150 may include one or a plurality of lenses, an image sensor and/or an image processor.

In an embodiment, the connector hole 104 may accommodate a connector for transmitting or receiving power and/or data to or from an external electronic device (for example, an electronic device 1102, 1104 of FIG. 11), and/or a connector for transmitting or receiving an audio signal to or from an external electronic device. For example, the connector hole 104 may include a USB connector or an earphone jack (or an "earphone interface"). In an embodiment, the USB connector and the earphone jack may be implemented by one hole, and in another embodiment, the electronic device 101 may transmit or receive power and/or data to or from an external device, or may transmit or receive an audio signal without a separate connector hole.

In an embodiment, the audio module 105 may include a microphone hole and a speaker hole. The microphone hole may have a microphone disposed therein to acquire an external sound, and may have a plurality of microphones disposed therein to detect a direction of a sound. In another example, the speaker hole and the microphone hole may be implemented by one hole, or a speaker (for example, a piezo speaker) may be included without a speaker hole. The speaker hole may include an external speaker hole and a receiver hole for communication.

In an embodiment, the electronic device 101 may include a sensor module (not shown) to generate an electronic signal or a data value corresponding to an internal operation state or an external environment state. The electronic device 101 may further include a sensor module (not shown), for example, at least one of a gesture sensor, a gyro sensor, an atmospheric pressure sensor, a magnetic sensor, an acceleration sensor, a grip sensor, a color sensor, an infrared (IR) sensor, a temperature sensor, or a humidity sensor.

FIG. 2 is a block diagram illustrating the electronic device 101 according to an embodiment.

In an embodiment, the electronic device 101 may include a display panel 120, a processor 210, a fingerprint sensor 230, and/or a memory 240. The display panel 120 may include a fingerprint sensing region 131.

In an embodiment, the display panel 120 may include a light-emitting diode (LED) panel, an organic LED (OLED) panel, an active-matrix organic LED (AMOLED) panel or a liquid crystal display (LCD) panel.

In an embodiment, the display panel 120 may include a plurality of pixels (PX). Each of the plurality of pixels PX may include at least one light-emitting element. The display panel 120 may output an image by driving the plurality of pixels PX in response to image data which is inputted from the outside.

In an embodiment, the electronic device 101 may include a touch sensor panel (TSP) on the display panel 120 in order to control a user interface outputted through the display panel 120 more intuitively. The touch sensor panel may acquire a touch on the display panel 120 by using at least one of a resistive film, capacitive components, a surface acoustic wave, and infrared rays. Alternatively, the touch sensor panel may detect a position of an object (for example, a user's finger or stylus pen) hovering over the display panel 120.

In an embodiment, the display panel 120 may include a plurality of layers. For example, the display panel 120 may include a cover window layer CWL where a cover window glass is disposed, and a pixel layer PXL where a plurality of light-emitting elements are disposed.

In an embodiment, at least a part of the display panel 120 may be set as the fingerprint sensing region 131.

In an embodiment, the display panel 120 may include a first light-emitting region 121 and a second light-emitting region 122 within the fingerprint sensing region 131. A plurality of light-emitting elements may be disposed in the first light-emitting region 121 and the second light-emitting region 122 in order to output light through the first light-emitting region 121 and/or the second light-emitting region 122.

In an embodiment, the second light-emitting region 122 may not overlap the first light-emitting region 121. That is, the first light-emitting region 121 and the second light-emitting region 122 may be disposed to be spaced apart from each other by a predetermined distance. In an example, a distance between the first light-emitting region 121 and the second light-emitting region 122 may be determined by considering a thickness of the cover window layer CWL disposed on an upper surface of the pixel layer PXL.

In an embodiment, the fingerprint sensor 230 may be disposed below the fingerprint sensing region 131 of the display panel 120. The fingerprint sensor 230 may be an optical fingerprint sensor that adopts a light detection method to use, as a light source, the plurality of light-emitting elements disposed in the first light-emitting region 121 and the second light-emitting region 122 within the fingerprint sensing region 131.

In an embodiment, the fingerprint sensor 230 may sense light outputted from the plurality of light-emitting elements disposed in the first light-emitting region 121 and/or the second light-emitting region 122, reflected by a user's fingerprint, and may sense the user's fingerprint by detecting the reflected light.

In an embodiment, the processor 210 may be electrically or operatively connected with the display panel 120, the fingerprint sensor 230, and/or the memory 240.

In an example, the processor 210 may execute computation or data processing related to control and/or communication of at least one other component of the electronic device 101 by using instructions stored in the memory 240. In an example, the processor 210 may include at least one of a central processing unit (CPU), a graphic processing unit (GPU), a micro controller unit (MCU), a sensor hub, a supplementary processor, a communication processor, an application processor, an application specific integrated circuit (ASIC), field programmable gate arrays (FPGA), and may have a plurality of cores.

In an embodiment, the processor 210 may sense an external object (for example, a part of user's body) contacting the fingerprint sensing region 131.

In an embodiment, the processor 210 may control the plurality of light-emitting elements disposed in the first light-emitting region 121 and the second light-emitting region 122 within the fingerprint sensing region 131. For example, the processor 210 may individually control the plurality of light-emitting elements disposed in the first light-emitting region 121 to output light through the first light-emitting region 121. The processor 210 may control the plurality of light-emitting elements disposed in the first light-emitting region 121 and the second light-emitting region 122, simultaneously, to output light through the first light-emitting region 121 and the second light-emitting region 122 substantially in the same way.

In an embodiment, light outputted from the first light-emitting region 121 and/or the second light-emitting region 122 may be reflected by a user's fingerprint, and the processor 210 may acquire a fingerprint image of the user through the reflected light through the fingerprint sensor 230.

In an embodiment, the memory 240 may be operatively coupled with the processor 310 to store one or more instructions inputted to the processor 210 and data to be used by the processor 210. The memory 240 may include at least one of a volatile memory such as a static random access memory (SRAM) or a dynamic RAM (DRAM), or a nonvolatile memory including not only a magnetoresistive RAM (MRAM), a spin-transfer torque MRAM (STT-MRAM), a phase-change RAM (PRAM), a resistive RAM (RRAM), a Ferroelectric RAM (FeRAM), but also a flash memory, an embedded multi-media card (eMMIC), a solid state drive (SSD).

In an embodiment, at least one or more instructions and data related to the memory 240 or the processor 210 may be related to recognizing a user fingerprint for biometric authentication.

Figure 3A:
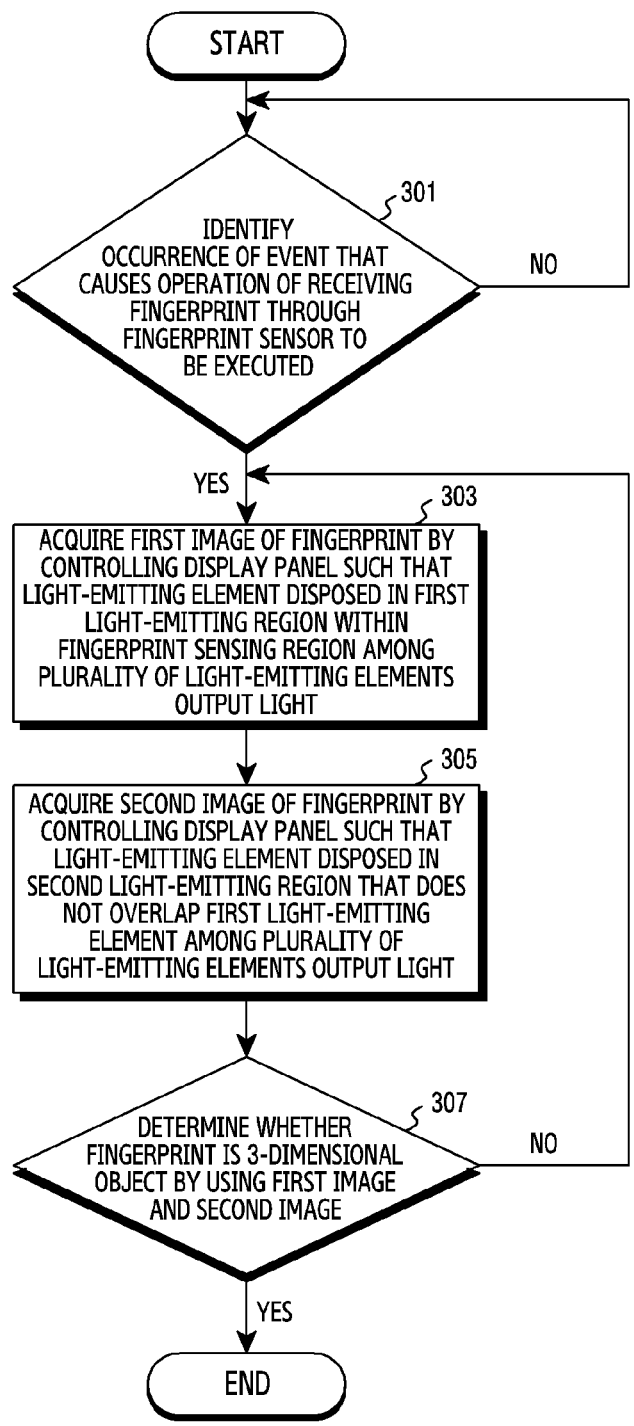
FIG. 3A is a sequence diagram illustrating operations of a fingerprint sensor for determining whether an input fingerprint is a three-dimensional object according to an embodiment.

FIG. 3A is a sequence diagram illustrating operations of the fingerprint sensor 230 for determining whether an inputted fingerprint is a 3-dimensional object according to an embodiment.

In an embodiment, in operation 301, the electronic device 101 (for example, the processor 210 of FIG. 2) may identify an occurrence of an event that causes an operation of receiving a fingerprint through the fingerprint sensor 230 to be executed.

In an embodiment, the event that causes the operation of receiving the fingerprint through the fingerprint sensor 230 to be executed may be an event that is attributable to a user input (for example, a touch, pressing of a physical button, and sensing by a sensor) and requires user authentication. For example, the event that requires user authentication may include an event that unlocks a lock screen of the electronic device 101 and an event that executes an application requiring security. In an example, the processor 210 may sense a user's fingerprint through the fingerprint sensing region 131 of the display panel 120 according to the occurrence of the event that causes the operation of receiving the fingerprint through the fingerprint sensor 230 to be executed.

According to an embodiment, when the electronic device 101 (for example, the processor 210 of FIG. 2) recognizes the occurrence of the event that causes the operation of receiving the fingerprint through the fingerprint sensor 230 to be executed in operation 301, the electronic device 101 may acquire a first image of the fingerprint (for example, a first image 510 of FIG. 5A) by controlling the display panel 120 such that light-emitting elements disposed in the first light-emitting region 121 within the fingerprint sensing region 131 among the plurality of light-emitting elements output light in operation 303.

In an embodiment, the processor 210 may transmit a signal for outputting light from the first light-emitting region 121 to the display panel 120. When the display panel 120 receives the control signal from the processor 210, the display panel 120 may operate to output light from the first light-emitting region 121.

In an embodiment, the processor 210 may acquire the first image 510 related to at least a certain region of the user's fingerprint contacting a first light output region (for example, a first light output region 221 of FIG. 4) and an overlapping region (for example, an overlapping region 223 of FIG. 4) through which light discharged from the first light-emitting region 121 is discharged from a surface of the display panel 120.

In an embodiment, in operation 305, the electronic device 101 (for example, the processor 210 of FIG. 2) may acquire a second image of the fingerprint (for example, a second image 520 of FIG. 5B) by controlling the display panel 120 such that light-emitting elements disposed in the second light-emitting region 122 that does not overlap the first light-emitting region 121 among the plurality of light-emitting elements output light.

In an embodiment, the processor 210 may transmit a signal for outputting light from the second light-emitting region 122 to the display panel 120. When the display panel 120 receives the control signal from the processor 210, the display panel 120 may operate to output light from the second light-emitting region 122. In an embodiment, the processor 210 may acquire the second image 520 related to at least a certain region of the user's fingerprint contacting a second light output region (for example, a second light output region 222 of FIG. 4) and the overlapping region (for example, the overlapping region 223 of FIG. 4) through which light discharged from the second light-emitting region 122 is discharged from the surface of the display panel 120.

In an embodiment, in operation 307, the electronic device 101 (for example, the processor 210 of FIG. 2) may determine whether the fingerprint is a three-dimensional object by using the first image 510 and the second image 520.

In an embodiment, when it is determined that the fingerprint is the three-dimensional object by using the first image 510 and the second image 520 in operation 307, the electronic device 101 (for example, the processor 210 of FIG. 2) may acquire a fingerprint image based on the first image 510 and the second image 520.

In an embodiment, a biometric authentication procedure performed after the electronic device (for example, the processor 210 of FIG. 2) determines whether the fingerprint is the three-dimensional object by using the first image 510 and the second image 520 will be described in detail with reference to FIG. 9.

In an embodiment, a method in which the processor 210 determines whether the fingerprint sensed in the fingerprint sensing region 131 is a three-dimensional object by using the first image 510 and the second image 520 will be described in detail with reference to FIGS. 4 to 6.

Figure 3B:
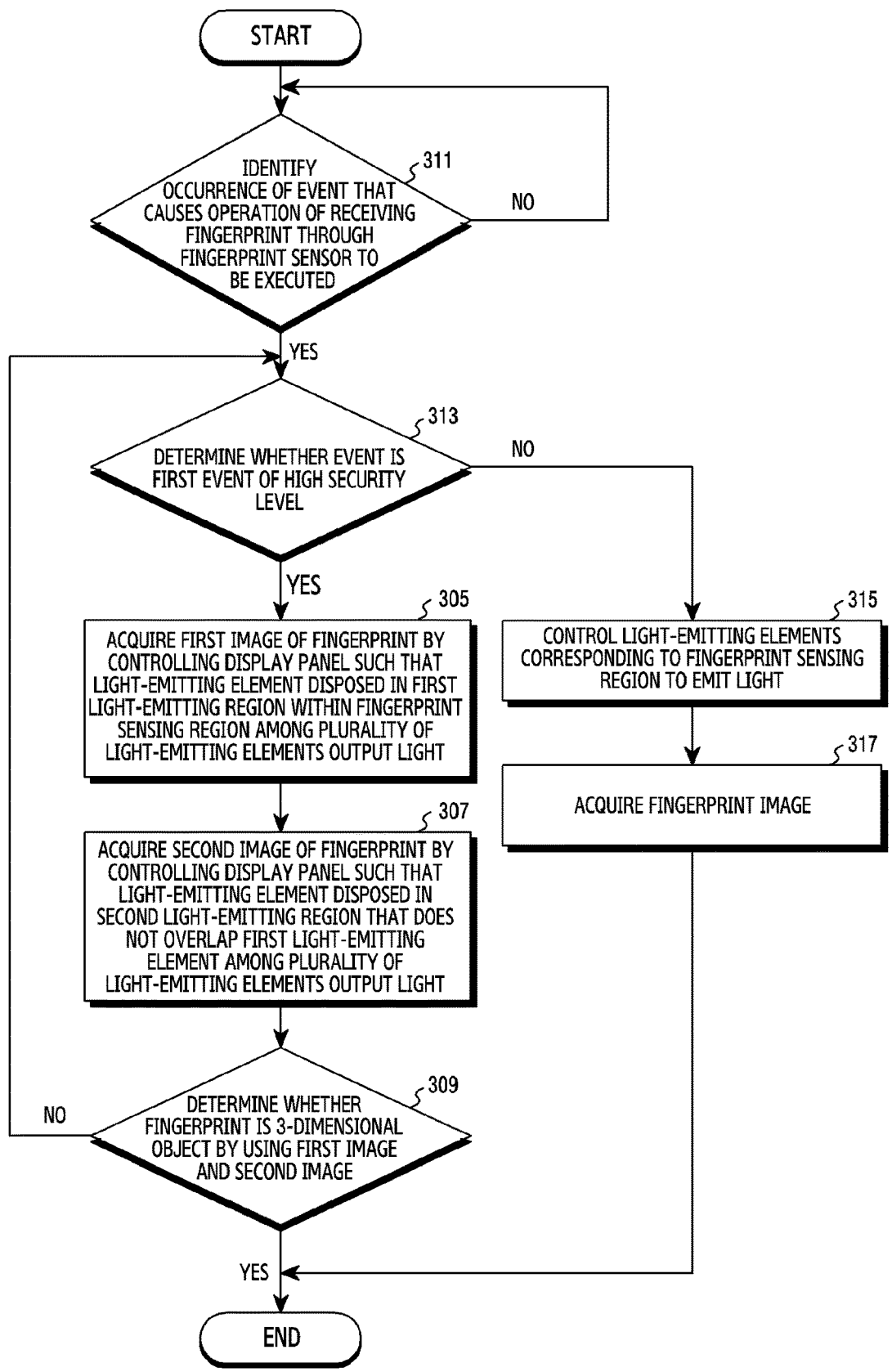
FIG. 3B is a sequence diagram illustrating operations of the fingerprint sensor for determining whether an input fingerprint is a three-dimensional object according to an embodiment.

FIG. 3B is a sequence diagram illustrating operations of the fingerprint sensor 230 for determining whether an inputted fingerprint is a three-dimensional object according to an embodiment.

According to an embodiment, in operation 311, the electronic device 101 (for example, the processor 210 of FIG. 2) may identify an occurrence of an event that causes an operation of receiving a fingerprint through the fingerprint sensor 230 to be executed.

According to an embodiment, when the electronic device 101 (for example, the processor 210 of FIG. 2) identifies the occurrence of the event that causes the operation of receiving the fingerprint through the fingerprint sensor 230 to be executed in operation 311, the electronic device 101 may determine whether the identified event is a first event of a high security level in operation 313. In an embodiment, the electronic device 101 may store security levels according to types of UIs corresponding to applications and/or a home screen of the electronic device 101 in the memory 240. In an example, the electronic device 101 may store a security level according to a content stored in the memory 240, and accordingly, may also a security level of a UI according to the content. In an embodiment, when the processor 210 executes a content stored in the memory 240 or a content received through a communication module (for example, the communication module 1190 of FIG. 11) according to a user input, and the executed content corresponds to an event that requires user authentication, the processor 210 may determine whether the event is the first event of the high security level. When the event corresponds to a higher security level than a pre-set security level, the processor 210 may determine that the event is the first event of the high security level. When the event corresponds to a lower security level than the pre-set security level, the processor 210 may determine that the event is a second event of a low security level.

According to an embodiment, when the identified event is the first event of the high security level in operation 313, the electronic device 101 (for example, the processor 210 of FIG. 2) may perform the same operations as operations 305 to 309 of FIG. 3A.

In an embodiment, when other people than a registered user performs a user authentication procedure by illegally using a 2D image of a fingerprint of the registered user and data such as private information of the registered user is leaked, a severe damage may be caused to the user. Accordingly, when the identified event is the first event of the high security level, the processor 210 may perform operations 305 to 309 to determine whether an external object contacting the fingerprint sensing region 131 is a three-dimensional object in order to solve the above-described security problem.

In an embodiment, when the electronic device 101 (for example, the processor 210 of FIG. 2) determines that the fingerprint is the three-dimensional object by using the first image 510 and the second image 520 in operation 309, the electronic device 101 may acquire a fingerprint image based on the first image 510 and the second image 520.

In an embodiment, a biometric authentication procedure after the electronic device (for example, the processor 210 of FIG. 2) determines that the fingerprint is the three-dimensional object by using the first image 510 and the second image 520 in operation 309 or after the electronic device acquires the fingerprint image in operation 317 will be described in detail with reference to FIG. 9.

According to an embodiment, when the identified event is not the first event of the high security level but is the second event of the low security level in operation 313, the electronic device 101 (for example, the processor 210 of FIG. 2) may control light-emitting elements corresponding to the fingerprint sensing region 131 to emit light in operation 315.

In an embodiment, when the identified event is not the first event of the high security level, the processor 210 may omit the process of determining whether the external object contacting the fingerprint sensing region 131 is the three-dimensional object, and may perform the user authentication procedure while reducing the time required to determine whether the fingerprint contacting the fingerprint sensing region 131 is the three-dimensional object.

According to an embodiment, in operation 317, the electronic device 101 (for example, the processor 210 of FIG. 2) may acquire an image of the fingerprint that is sensed in the fingerprint sensing region 131.

In an embodiment, the processor 210 may acquire the image of the user fingerprint by controlling the light-emitting elements corresponding to the fingerprint sensing region 131 to emit light simultaneously, and sensing light outputted through the fingerprint sensing region 131, reflected by the user's fingerprint contacting the fingerprint sensing region 131.

Figure 4:
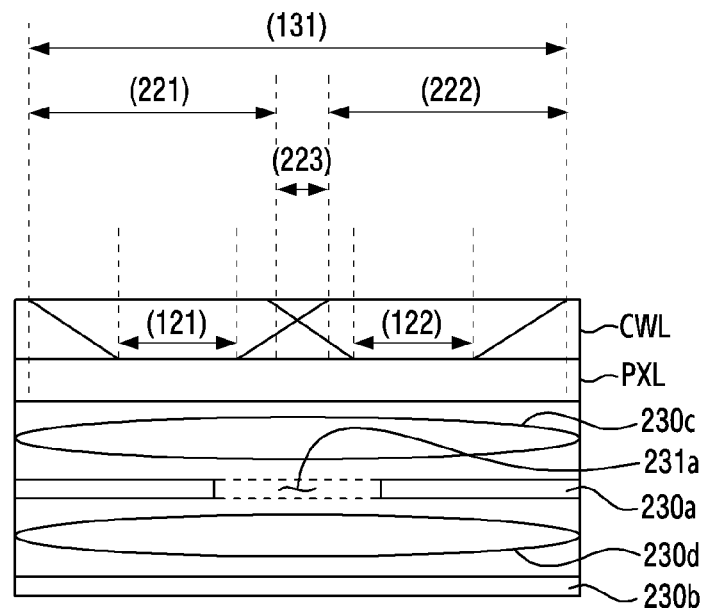
FIG. 4 is a cross-sectional view of a fingerprint sensing region within a display panel of the electronic device according to an embodiment.

FIG. 4 is a cross-sectional view of the fingerprint sensing region 131 within the display panel 120 of the electronic device 101 according to an embodiment.

In an embodiment, the display panel 120 may include a cover window layer CWL and a pixel layer PXL in which a plurality of light-emitting elements are disposed.

In an embodiment, the cover window layer CWL may be formed or include by transparent plastic or glass, and may protect an upper surface of the display panel 120.

In an embodiment, the pixel layer PXL may be disposed on a rear surface of the cover window layer CWL. The pixel layer PXL may include an organic light-emitting diode, but this should not be considered as limiting. For another example, the pixel layer PXL may be configured by a quantum dot light-emitting display or a liquid crystal display. The display panel 120 may include a plurality of various layers in addition to the cover window layer CWL and the pixel layer PXL.

In an embodiment, the fingerprint sensing region 131 of the display panel 120 may include the first light-emitting region 121 and the second light-emitting region 122. Light may be outputted from the first light-emitting region 121 by a plurality of light-emitting elements corresponding to the first light-emitting region 121 in the pixel layer PXL. Light may be outputted from the second light-emitting region 122 by a plurality of light-emitting elements corresponding to the second light-emitting region 122 in the pixel layer PXL.

In an embodiment, the processor 210 may control the plurality of light-emitting elements corresponding to the first light-emitting region 121 to output light through the first light-emitting region 121. The light outputted through the first light-emitting region 121 may be diffused and may be outputted from the surface of the display panel 120 with various intensities of luminance. Referring to FIG. 4, the light outputted through the first light-emitting region 121 may be diffused and may be discharged from the surface of the display panel 120 through the first light output region 221 and the overlapping region 223.

In an embodiment, the processor 210 may control the plurality of light-emitting elements corresponding to the second light-emitting region 122 to output light through the second light-emitting region 122. The light outputted through the second light-emitting region 122 may be diffused and may be outputted from the surface of the display panel 120 with various intensities of luminance. Referring to FIG. 4, the light outputted through the second light-emitting region 122 may be diffused and may be discharged from the surface of the display panel 120 through the second light output region 222 and the overlapping region 223.

In an embodiment, the first light-emitting region 121 and the second light-emitting region 122 may be disposed in regions that do not overlap each other, but the light outputted from the first light-emitting region 121 and the light outputted from the second light-emitting region 122 may be discharged through the overlapping region 223.

In an embodiment, when the processor 210 outputs light by controlling the plurality of light-emitting elements corresponding to the first light-emitting region 121, the processor 210 may acquire a first image (for example, the first image 510 of FIG. 5A) through the fingerprint sensor 230. The first image 510 may correspond to a fingerprint image of a user that is disposed over the first light output region 221 and the overlapping region 223 within the fingerprint sensing region 131.

In an embodiment, when the processor 210 outputs light by controlling the plurality of light-emitting elements corresponding to the second light-emitting region 122, the processor 210 may acquire a second image (for example, the second image 520 of FIG. 5B) through the fingerprint sensor 230. The second image 520 may correspond to a fingerprint image of the user that is disposed over the second light output region 222 and the overlapping region 223 within the fingerprint sensing region 131.

In an embodiment, the first image 510 and the second image 520 may each include a fingerprint image related to a fingerprint that is sensed on the overlapping region 223. Accordingly, the first image 510 and the second image 520 may include a fingerprint image related to the same region in the sensed fingerprint.

In an embodiment, the processor 210 may determine whether the user fingerprint sensed through the fingerprint sensing region 131 is a three-dimensional object by using the first image 510 and the second image 520. In an example, the processor 210 may determine whether the user fingerprint sensed through the fingerprint sensing region 131 is the three-dimensional object through the first image 510 and the second image 520 including the fingerprint image of the user that is sensed on the overlapping region 223.

Hereinafter, a structure of the fingerprint sensor 230 and a method in which the processor 210 determines whether a fingerprint is a three-dimensional object by using the first image 510 and the second image 520 will be described.

In an embodiment, the fingerprint sensor 230 may be disposed below the fingerprint sensing region 131 of the display panel 120.

In an embodiment, the fingerprint sensor 230 may include a light transmission layer 230a, a light sensing layer 230b, a first lens 230c, and a second lens 230d. Referring to FIG. 4, it is illustrated that the fingerprint sensor 230 includes two lenses, but this should not be considered as limiting, and the fingerprint sensor 230 may include a plurality of lenses in another embodiment.

In an embodiment, the light transmission layer 230a may include a light transmission hole 231a and a light blocking pattern. In an example, the light transmission layer 230a may include the light transmission hole 231a that is uniformly provided to the light blocking pattern to have a certain size and a gap. The light transmission hole 231a may be arranged at regular intervals. A part of the light entering the light transmission layer 230a may be blocked by the light blocking pattern, whereas the other part of the light may reach the light sensing layer 230b through the light transmission hole.

In an embodiment, the light sensing layer 230b may include a plurality of photo sensors. For example, the light sensing layer 230b may include a plurality of photo sensors which are implemented by a semiconductor layer or a chip in which a photo diode, a photo transistor, a photo gate are formed. In an example, the light sensing layer 230b may include a plurality of photo sensors in which an image sensor such as a CMOS image sensor (CIS), a thin film transistor (TFT) image sensor, an organic TFT image sensor, a charge coupled device (CCD) is implemented.

In an embodiment, when the processor 210 outputs light from the first light-emitting region 121 by controlling the plurality of light-emitting elements corresponding to the first light-emitting region 121, the light outputted from the first light-emitting region 121 may be diffused and may be discharged to the first light output region 221 and the overlapping region 223 from the surface of the display panel 120. The light outputted from the first light-emitting region 121 may be outputted through the overlapping region 223. In this case, the light outputted through the overlapping region 223 may have a wave vector of a first direction ($\vec{k}$) The light outputted through the overlapping region 223 may have a phase component added, which corresponds to a material property (or thickness information) when the light outputted through the overlapping region 223 is reflected by at least a certain region of a user fingerprint sensed on the overlapping region 223.

In an embodiment, the light outputted from the first light-emitting region 121 in the first direction ($\vec{k}$) and discharged through the overlapping region 223 may be reflected on at least a certain region of the user fingerprint sensed through the overlapping region 223, and may pass through the first lens 230c. In this case, a space signal related to the user fingerprint contacting the overlapping region 223 may be expressed as space frequency information through Fourier transform, so that the space frequency information may be shifted as much as the first direction ($\vec{k}$).

In an embodiment, when the light outputted through the first light output region 221 and the overlapping region 223 and passing through the first lens 230c passes through the light transmission layer 230a, the shifted space frequency may undergo low pass filter (LPF) by an aperture in an imaging system.

In an embodiment, when the light outputted through the first light output region 221 and the overlapping region 223 and passing through the light transmission layer 230a passes through the second lens 230d, the light may undergo inverse Fourier transform.

In an embodiment, the light outputted through the first light output region 221 and the overlapping region 223 and passing through the second lens 230d may reach the light sensing layer 230b. The light sensing layer 230b may sense an amplitude component except for the phase component from the light, which is outputted through the first light output region 221 and the overlapping region 223 and passes through the second lens 230d, through the plurality of photo sensors included in the light sensing layer 230b.

In an embodiment, when the processor 210 outputs light from the second light-emitting region 122 by controlling the plurality of light-emitting elements corresponding to the second light-emitting region 122, the light outputted from the second light-emitting region 122 may be diffused and may be discharged from the surface of the display panel 120 through the second light output region 222 and the overlapping region 223. The light outputted from the second light-emitting region 122 may be outputted through the overlapping region 223. In this case, the light outputted through the overlapping region 223 may have a wave vector of a second direction ($\overrightarrow{-k}$) which is opposite to the first direction ($\overrightarrow{k}$). The light outputted through the overlapping region 223 may have a phase component added, which corresponds to a material property (or thickness information) when the light outputted through the overlapping region 223 is reflected by at least a certain region of a user fingerprint sensed on the overlapping region 223.

In an embodiment, the light outputted from the second light-emitting region 122 in the second direction ($\overrightarrow{-k}$) and discharged through the overlapping region 223 may be reflected on at least a certain region of the user fingerprint sensed on the overlapping region 223, and may pass through the first lens 230c. In this case, a space signal related to the user fingerprint contacting the overlapping region 223 may be expressed as space frequency information through Fourier transform, so that the space frequency information may be shifted as much as the second direction ($\overrightarrow{-k}$).

In an embodiment, when the light outputted through the second light output region 222 and the overlapping region 223 and passing through the first lens 230c passes through the light transmission layer 230a, the shifted space frequency may undergo low pass filter (LPF) by the aperture in the imaging system.

In an embodiment, when the light outputted through the second light output region 222 and the overlapping region 223 and passing through the light transmission layer 230a passes through the second lens 230d, the light may undergo inverse Fourier transform.

In an embodiment, the light outputted through the second light output region 222 and the overlapping region 223 and passing through the second lens 230d may reach the light sensing layer 230b. The light sensing layer 230b may sense an amplitude component except for the phase component from the light, which is outputted through the second light output region 222 and the overlapping region 223 and passes through the second lens 230d, through the plurality of photo sensors included in the light sensing layer 230b.

In an embodiment, the first light-emitting region 121 and the second light-emitting region 122 may not have regions that overlap each other. Accordingly, the light outputted by the plurality of light-emitting elements corresponding to the first light-emitting region 121 with respect to the overlapping region 223 may have the first direction ($\overrightarrow{k}$) and the light outputted by the plurality of light-emitting elements corresponding to the second light-emitting region 122 with respect to the overlapping region 223 may have the second direction ($\overrightarrow{-k}$).

In an embodiment, the processor 210 may acquire the first image 510 by controlling the plurality of light-emitting elements corresponding to the first light-emitting region 121. The processor 210 may acquire the second image 520 by controlling the plurality of light-emitting elements corresponding to the second light-emitting region 122.

In an embodiment, the first image 510 and the second image 520 may include a fingerprint image related to the fingerprint sensed on the overlapping region 223.

In an embodiment, when the user's fingerprint sensed on the overlapping region 223 is a three-dimensional object, the fingerprint image that is related to the fingerprint sensed on the overlapping region 223 and is included in the first image 510, and the fingerprint image that is related to the fingerprint sensed on the overlapping region 223 and is included in the second image 520 may include phase components that are shifted in different directions in a Fourier domain.

In an embodiment, when the fingerprint sensed on the overlapping region 223 is not a three-dimensional object but a two-dimensional image (e.g., two-dimensionally printed fingerprint image), there is no difference in the material property (or thickness property), and the fingerprint image that is related to the fingerprint sensed on the overlapping region 223 and is included in the first image 510, and the fingerprint image that is related to the fingerprint sensed on the overlapping region 223 and is included in the second image 520 have no phase component, and hence, may be the same.

Figure 5A:
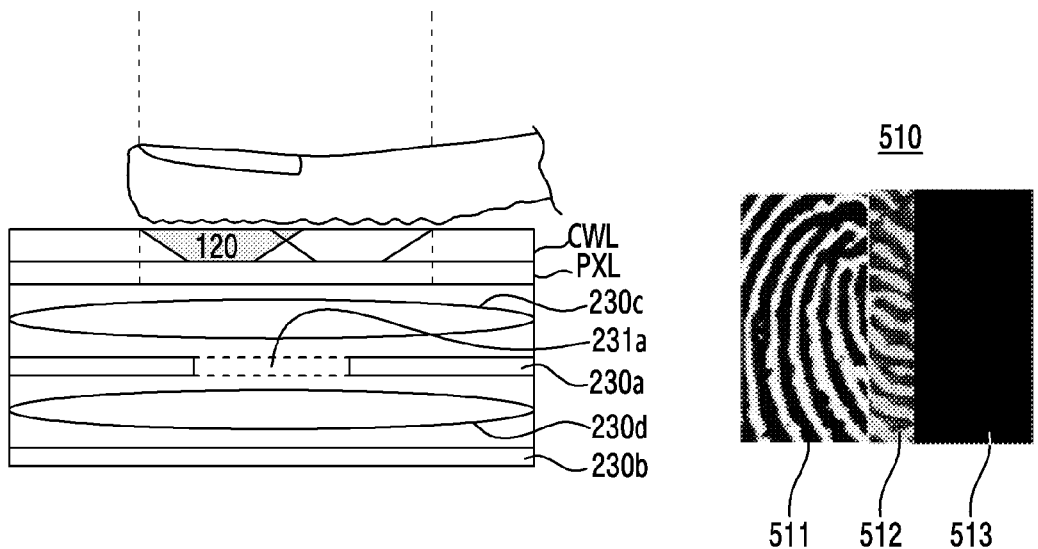
FIG. 5A is a view illustrating a first image which is acquired through the fingerprint sensor according to a light-emitting region of the electronic device according to an embodiment.
Figure 5B:
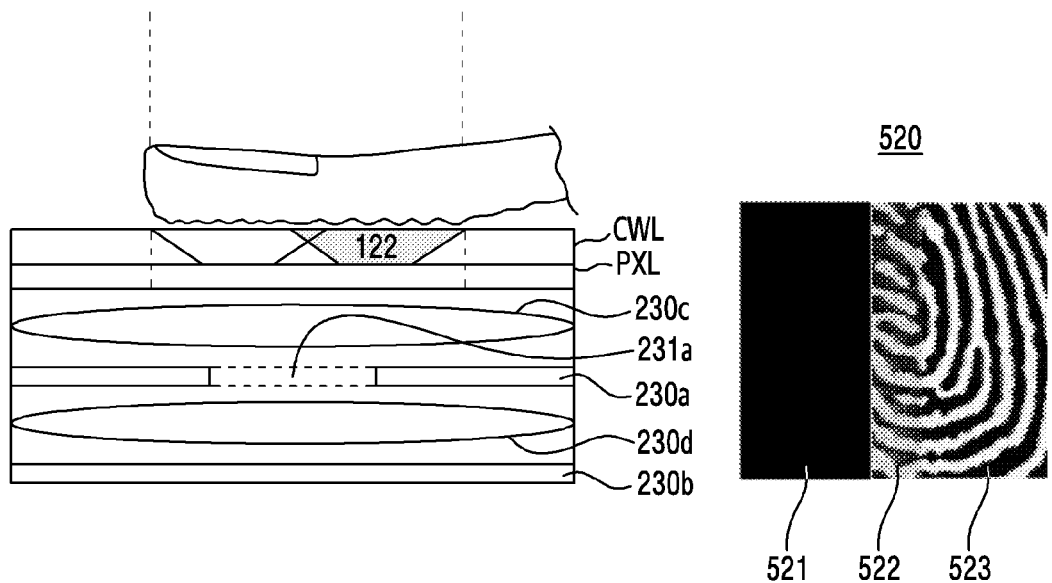
FIG. 5B is a view illustrating a second image which is acquired through the fingerprint sensor according to a light-emitting region of the electronic device according to an embodiment.

FIGS. 5A and 5B illustrate the first image 510 and the second image 520 which are acquired through the fingerprint sensor 230 according to a light-emitting region of the electronic device 101 according to an embodiment.

Referring to FIG. 5A, the processor 210 may control the plurality of light-emitting elements corresponding to the first light-emitting region 121 through the display panel 120. When light is outputted from the first light-emitting region 121 by the display panel 120, the processor 210 may acquire the first image 510 through the fingerprint sensor 230.

Referring to FIG. 5B, the processor 210 may control the plurality of light-emitting elements corresponding to the second light-emitting region 122 through the display panel 120. When light is outputted from the second light-emitting region 122 by the display panel 120, the processor 210 may acquire the second image 520 through the fingerprint sensor 230.

In an embodiment, the first image 510 may include a first sensing region 511 corresponding to the first light output region 221, a second sensing region 512 corresponding to the overlapping region 223, and a third sensing region 513 corresponding to the second light output region 222.

In an embodiment, the third sensing region 513 of the first image 510 may be a region corresponding to the second light output region 222 that light diffused in the first light-emitting region 121 does not reach. Accordingly, a component of the first image 510 that is included in the third sensing region 513 may correspond to a noise component.

In an embodiment, when the noise component is included in the third sensing region 513 of the first image 510, the processor 210 may filter a noise from a fingerprint image included in a third sensing region 523 of the second image 520, based on the noise component included in the third sensing region 513 of the first image 510.

In an embodiment, the second image 520 may include a first sensing region 521 corresponding to the first light output region 221, a second sensing region 522 corresponding to the overlapping region 223, and the third sensing region 523 corresponding to the second light output region 222.

In an embodiment, the first sensing region 521 of the second image 520 may be a region corresponding to the first light output region 221 that light diffused in the second light-emitting region 122 does not reach. Accordingly, a component of the second image 520 that is included in the first sensing region 521 may correspond to a noise component.

In an embodiment, when the noise component is included in the first sensing region 521 of the second image 520, the processor 210 may filter a noise from a fingerprint image included in the first sensing region 511 of the first image 510, based on the component included in the first sensing region 521 of the second image 520.

Figure 6:
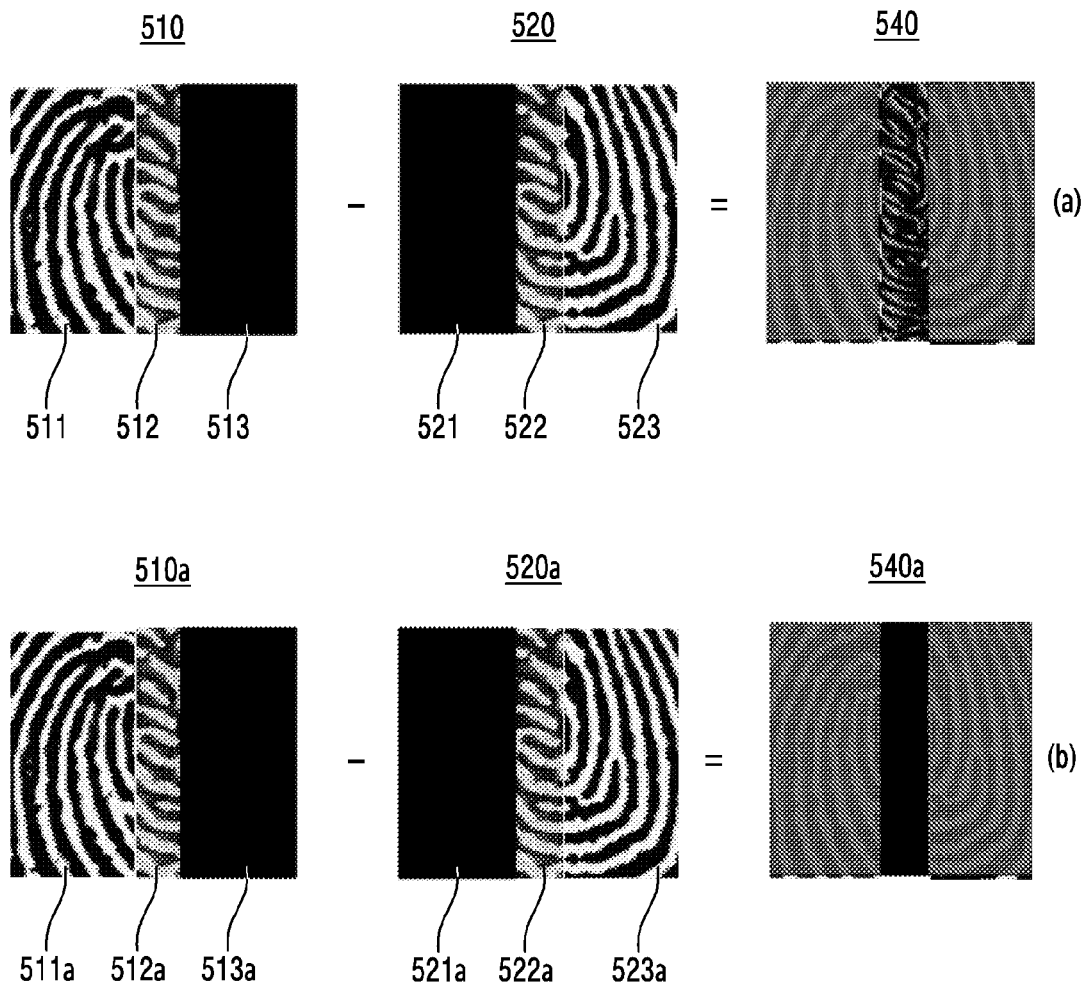
FIG. 6 is a view illustrating a method of determining whether a fingerprint is a three-dimensional object by using the first image and the second image which are acquired through the fingerprint sensor of the electronic device according to an embodiment.

FIG. 6 illustrates a method of determining whether a fingerprint is a three-dimensional object by using the first image 510 and the second image 520 which are acquired through the fingerprint sensor 230 of the electronic device 101 according to an embodiment.

Referring to view (a) of FIG. 6, when a user's real fingerprint (e.g., three-dimensional fingerprint) is sensed on the fingerprint sensing region 131, the processor 210 may acquire an image 540 that includes a phase difference indicating material properties (or thickness property) of a ridge and a valley of the real fingerprint according to light having different wave vectors when the second sensing region 522 of the second image 520 is subtracted from the second sensing region 512 of the first image 510.

Referring to view (b) of FIG. 6, when a 2D user fingerprint image (e.g., two-dimensionally printed fingerprint image) other than the user's real finger contacts the fingerprint sensing region 131, the processor 210 may acquire an image without a phase difference (for example, a monochrome image) 540a since the second sensing region 512 of the first image 510 and the second sensing region 522 of the second image 520 include the same component although light has different wave vectors when the second sensing region 522 of the second image 520 is subtracted from the second sensing region 512 of the first image 510.

In an embodiment, the other regions of the first image 510 and the second image 520 except for the second sensing region 512 of the first image 510 and the second sensing region 522 of the second image 520 may be images that are not used in an algorithm for determining whether a fingerprint is a three-dimensional object.

Figure 7:
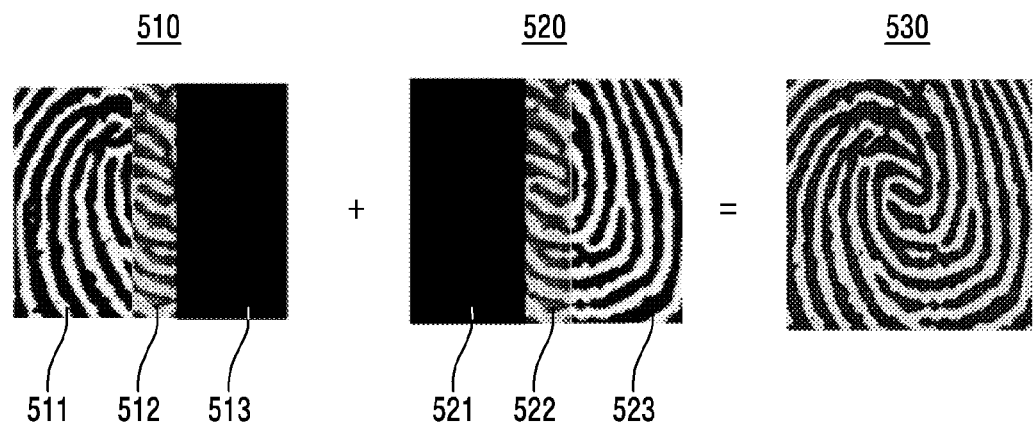
FIG. 7 is a view illustrating a fingerprint image which is acquired based on the first image and the second image which are acquired through the fingerprint sensor of the electronic device according to an embodiment.

FIG. 7 illustrates a fingerprint image 530 which is acquired based on the first image 510 and the second image 520 acquired through the fingerprint sensor 230 of the electronic device 101 according to an embodiment.

In an embodiment, the processor 210 may acquire the fingerprint image 530 related to a fingerprint which is sensed on the fingerprint sensing region 131, based on the first image 510 and the second image 520.

In an embodiment, the processor 210 may acquire a subtraction component of an image related to the first sensing region 521 of the second image 520 from an image related to the first sensing region 511 of the first image 510.

In an embodiment, the processor 210 may acquire an adding component of an image related to the second sensing region 522 of the second image 520 to an image related to the second sensing region 512 of the first image 510.

In an embodiment, the processor 210 may acquire a subtraction component of an image related to the third sensing region 513 of the first image 510 from an image related to the third sensing region 523 of the second image 520.

In an embodiment, the processor 210 may acquire a subtraction component of the image related to the third sensing region 523 of the second image 520 from the image related to the third sensing region 513 of the first image 510.

In an embodiment, the processor 210 may determine whether the fingerprint image 530 acquired based on the first image 510 and the second image 520 matches fingerprint information stored in the memory 240. When the acquired fingerprint image 530 matches the fingerprint information stored in the memory 240, the processor 210 may perform a step after user authentication is performed according to biometric authentication.

FIGS. 8A to 8H illustrate various light output regions which are disposed in the fingerprint sensing region 131 of the electronic device 101 according to an embodiment.

In an embodiment, the processor 210 may configure the fingerprint sensing region 131 to include light output regions of various shapes and/or sizes.

In an embodiment, the overlapping region 223 may include at least one or more overlapping regions. FIGS. 8A to 8D and FIG. 8H show an example of the overlapping region 233 including one overlapping region. FIGS. 8E to 8G show an example of the overlapping region 233 including a plurality of overlapping regions.

Referring to FIGS. 8A to 8H, FIG. 8A may include a first light output region 221a disposed on the left, a second light output region 222a disposed on the right, and an overlapping region 223a.

Figure 8A:
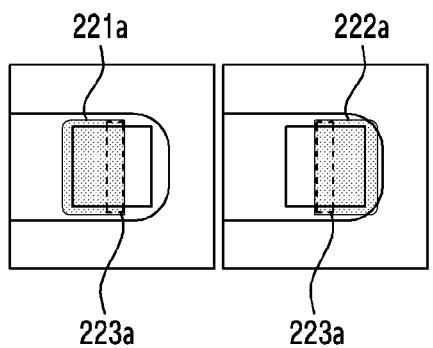
FIGS. 8A to 8H are views illustrating various light-emitting regions which are disposed in the fingerprint sensing region of the electronic device according to an embodiment.
Figure 8B:
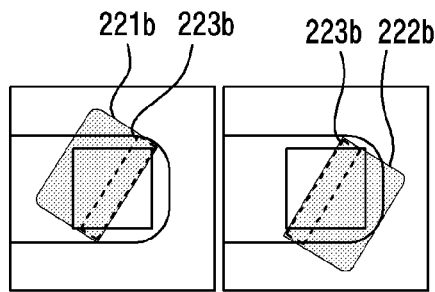

In an embodiment, FIG. 8B may include a first light output region 221b disposed on the left of a diagonal line, a second light output region 222b disposed on the right of the diagonal line, and an overlapping region 223b.

Figure 8C:
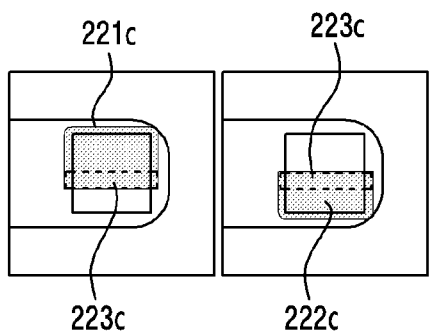

In an embodiment, FIG. 8C may include a first light output region 221c disposed on an upper side, a second light output region 222c disposed on a lower side, and an overlapping region 223c.

Figure 8D:
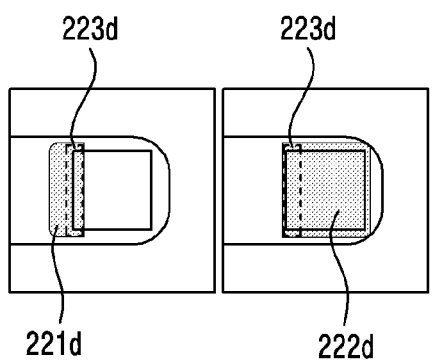
Figure 8E:
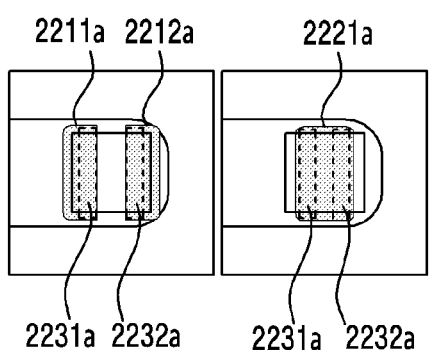
Figure 8F:
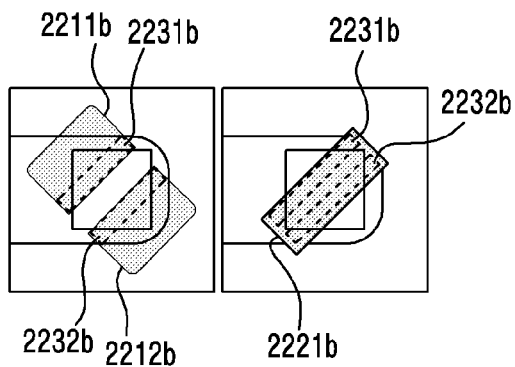
Figure 8G:
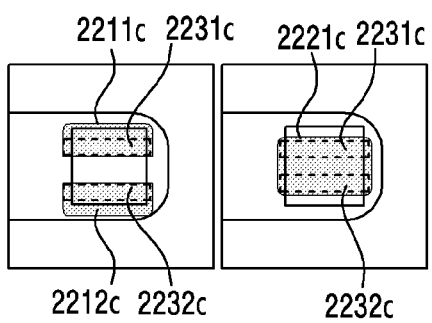

In an embodiment, FIG. 8D may include a first light output region 221d disposed on the left, a second light output region 222d disposed on the right, and an overlapping region 223d. In an example, an area of the second light output region 222d may be larger than an area of the first light output region 221d. In another example, the area of the first light output region 221d may be larger than the area of the second light output region 222d.

In an embodiment, FIG. 8E may include a first light output region 2211a, a second light output region 2212a, a third light output region 2221a, a first overlapping region 2231a, and a second overlapping region 2232a.

In an embodiment, FIG. 8F may include a first light output region 2211b, a second light output region 2212b, a third light output region 2221b, a first overlapping region 2231b, and a second overlapping region 2232b.

In an embodiment, FIG. 8G may include a first light output region 2211c, a second light output region 2212c, a third light output region 2221c, a first light output region 2231c, and a second light output region 2232c.

Figure 8H:
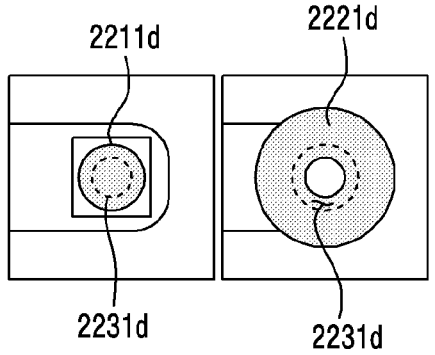

In an embodiment, FIG. 8H may include a first light output region 2211d, a second light output region 2221d, and an overlapping region 2231d. In an example, the first light output region 2211d and the second light output region 2221d may include a radiative light output region.

In an embodiment, in response to the operation of identifying the occurrence of the event that causes the operation of receiving the fingerprint through the fingerprint sensor 230 to be executed, the processor 210 may control the plurality of light-emitting elements to output light through the first light output region 221a and the second light output region 222a. The processor 210 may acquire the first image 510 and the second image 520 which include a fingerprint image related to a fingerprint sensed on the overlapping region 223a. In an example, the processor 210 may determine whether the fingerprint sensed on the fingerprint sensing region 131 is a three-dimensional object by using the first image 510 and the second image 520 which include the fingerprint image related to the fingerprint sensed on the overlapping region 223a.

In an embodiment, when the processor 210 identifies an occurrence of another event that causes an operation of receiving a fingerprint through the fingerprint sensor 230 to be executed after the occurrence of the event, the processor 210 may control the plurality of light-emitting elements to output light through the first light output region 221b and the second light output region 222b in response thereto. The processor 210 may acquire the first image 510 and the second image 520 which include a fingerprint image related to the fingerprint sensed on the overlapping region 223b. In an example, the processor 210 may determine whether the fingerprint sensed on the fingerprint sensing region 131 is a three-dimensional object by using the first image 510 and the second image 520 which include the fingerprint image related to the fingerprint sensed on the overlapping region 223b.

In an embodiment, the processor 210 may configure the first light output region 221 and the second light output region 222 to include various overlapping regions 223 as illustrated in the examples shown in FIGS. 8A to 8H, and may control to acquire a fingerprint image through a different light output region every time the event that causes the operation of receiving the fingerprint through the fingerprint sensor 230 to be executed occurs, so that the effect of security for user authentication can be enhanced.

In an embodiment, in response to the occurrence of another event that causes the operation of receiving the fingerprint to be executed after the occurrence of the event, the processor 210 may acquire a third image of the fingerprint by controlling light-emitting element disposed in a third light-emitting region which is distinguished from the first light-emitting region 121 to output light, and may acquire a fourth image of the fingerprint by controlling light-emitting elements disposed in a fourth light-emitting region which is distinguished from the second light-emitting region 122 and does not overlap the third light-emitting region. In an example, the first light output region corresponding to the first light-emitting region 121 may be the first light output region 221a of FIG. 8A. The second light output region corresponding to the second light-emitting region 122 may be the second light output region 222a of FIG. 8A. A third light output region corresponding to the third light-emitting region may be the first light output region 221b of FIG. 8B. A fourth light output region corresponding to the fourth light-emitting region may be the second light output region 222b of FIG. 8B.

Figure 9:
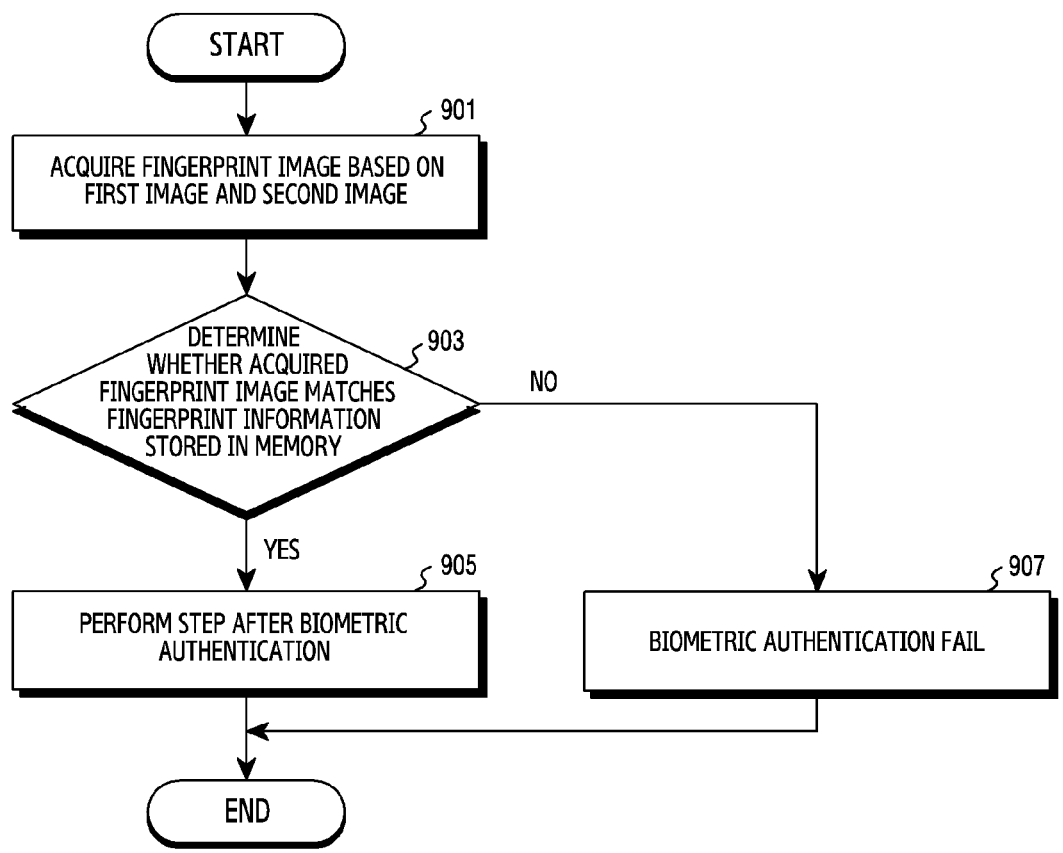
FIG. 9 is a view illustrating a biometric authentication procedure which is performed through the fingerprint sensor according to an embodiment.

FIG. 9 illustrates a biometric authentication procedure performed through the fingerprint sensor 230 according to an embodiment.

According to an embodiment, a biometric authentication procedure performed after the biometric authentication procedure is performed after operation 307 of FIG. 3A will be described.

According to an embodiment, when it is determined that the fingerprint is a three-dimensional object by using the first image 510 and the second image 520 in operation 307 of FIG. 3A, the electronic device 101 (for example, the processor 210 of FIG. 2) may acquire a fingerprint image (for example, the fingerprint image 530 of FIG. 7) based on the first image 510 and the second image 520 in operation 901.

In an embodiment, the processor 210 may acquire the fingerprint image 530 related to the fingerprint sensed on the fingerprint sensing region 131 by adding the first image 510 and the second image 520.

According to an embodiment, in operation 903, the electronic device 101 (for example, the processor 210 of FIG. 2) may determine whether the acquired fingerprint image 530 matches fingerprint information stored in the memory 340.

In an embodiment, the electronic device 101 may store fingerprint information for user authentication in the memory 340 according to an application.

In an embodiment, the processor 210 may compare the fingerprint image 530 acquired for user authentication and a pre-stored fingerprint image.

According to an embodiment, when the acquired fingerprint image 530 does not match the pre-stored fingerprint image, the electronic device 101 (for example, the processor 210 of FIG. 2) may determine that biometric authentication for user authentication fails in operation 907. When it is determined that biometric authentication for user authentication fails, the processor 210 may acquire information on a new fingerprint image through the fingerprint sensor 230.

According to an embodiment, when the acquired fingerprint image 530 matches the pre-stored fingerprint image, the electronic device 101 (for example, the processor 210 of FIG. 2) may determine that biometric authentication for user authentication succeeds in operation 905. When it is determined that biometric authentication for user authentication succeeds, the processor 210 may perform a step after the biometric authentication procedure.

Figure 10:
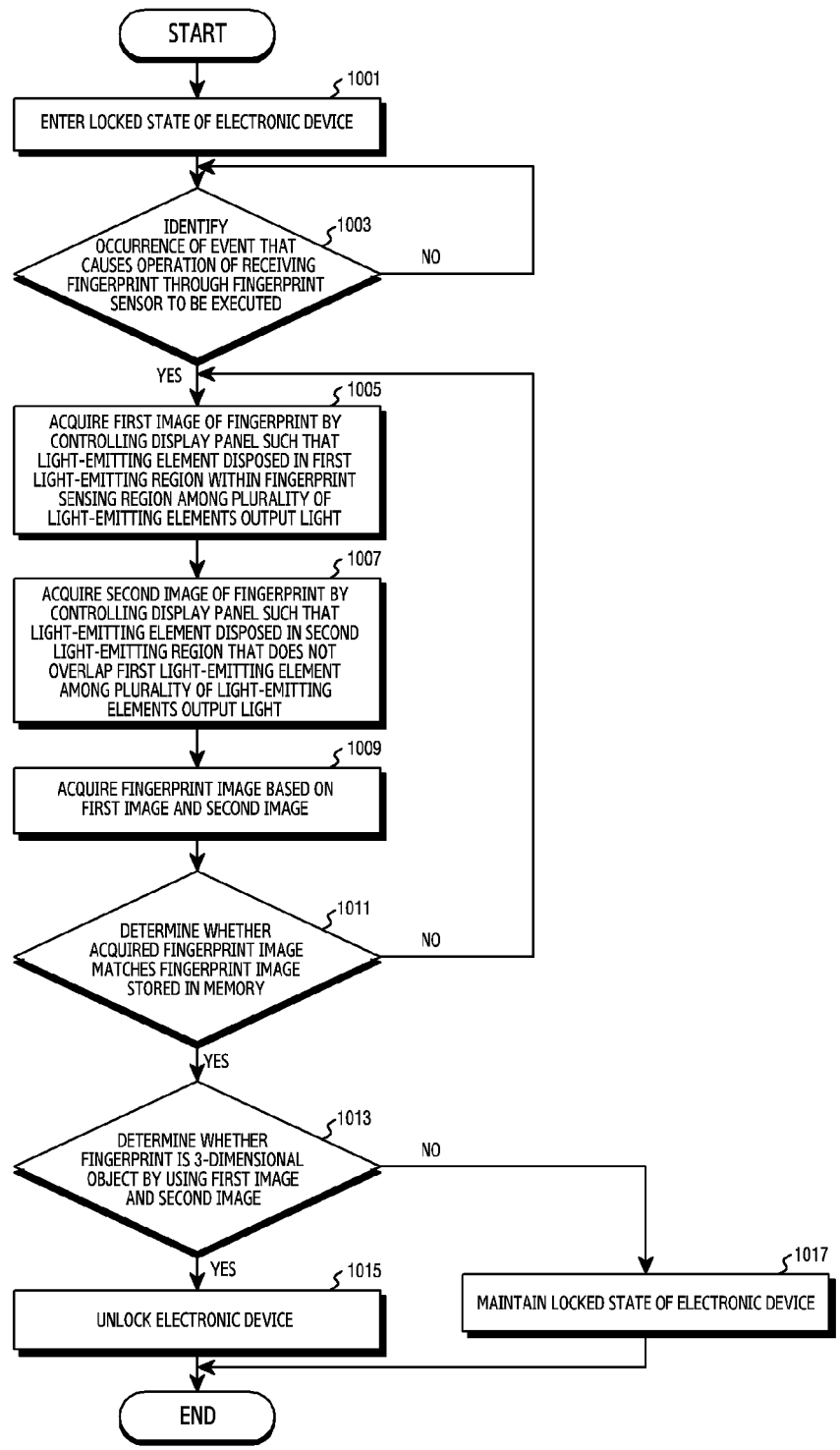
FIG. 10 is a view illustrating a biometric authentication procedure which is performed through the fingerprint sensor according to an embodiment.

FIG. 10 illustrates a biometric authentication procedure performed through the fingerprint sensor 230 according to an embodiment.

FIG. 10 is a sequence diagram illustrating a biometric authentication procedure performed through the fingerprint sensor 230 when the electronic device 101 is in a locked state.

According to an embodiment, in operation 1001, the electronic device 101 (for example, the processor 210 of FIG. 2) may enter the locked state of the electronic device 101.

In an embodiment, when the electronic device 101 does not operate for a designated time or an input is applied to a power button (for example, a UI for a key input button or a power button) by a user, the processor 210 may enter the locked state of the electronic device 101.

According to an embodiment, in operation 1003, the electronic device 101 (for example, the processor 210) may identify an occurrence of an event that causes an operation of receiving a fingerprint through the fingerprint sensor 230 to be executed.

According to an embodiment, when the occurrence of the event that causes the operation of receiving the fingerprint through the fingerprint sensor 230 to be executed is identified in operation 1003, the electronic device 101 (for example, the processor 210 of FIG. 2) may acquire a first image 510 of the fingerprint by controlling the display panel 120 such that light-emitting elements disposed in the first light-emitting region 121 within the fingerprint sensing region 131 among the plurality of light-emitting elements output light in operation 1005.

According to an embodiment, in operation 1007, the electronic device 101 (for example, the processor 210 of FIG. 2) may acquire a second image 520 of the fingerprint by controlling the display panel 120 such that light-emitting elements disposed in the second light-emitting region 122 that does not overlap the first light-emitting region 121 among the plurality of light-emitting elements output light.

According to an embodiment, in operation 1009, the electronic device 101 (for example, the processor 210 of FIG. 2) may acquire a fingerprint image (for example, the fingerprint image 530 of FIG. 7) based on the first image 510 and the second image 520.

According to an embodiment, in operation 1011, the electronic device 101 (for example, the processor 210 of FIG. 2) may determine whether the acquired fingerprint image 530 matches fingerprint information stored in the memory 340. In an embodiment, when the acquired fingerprint image 530 does not match the fingerprint information stored in the memory 340, the processor 210 may resume operation 1005 to acquire a fingerprint image through the fingerprint sensor 230.

According to an embodiment, when the acquired fingerprint image 530 matches the fingerprint information stored in the memory 340, the electronic device 101 (for example, the processor 210 of FIG. 2) may determine whether the fingerprint is a three-dimensional object by using the first image 510 and the second image 520 in operation 1011.

In an embodiment, when it is determined that the fingerprint is the three-dimensional object by using the first image 510 and the second image 520, the processor 210 may acquire the fingerprint image 530 based on the first image 510 and the second image 520. In another embodiment, the processor 210 may acquire the fingerprint image 530 based on the first image 510 and the second image 520, and, when the acquired fingerprint image 530 matches fingerprint information stored in the memory 340, the processor 210 may determine whether the fingerprint image is a three-dimensional object by using the first image 510 and the second image 520.

According to an embodiment, when the fingerprint sensed through the fingerprint sensing region 131 is the three-dimensional object, the electronic device 101 (for example, the processor 210 of FIG. 2) may unlock the electronic device 101 in operation 1015.

According to an embodiment, when the fingerprint sensed through the fingerprint sensing region 131 is not the three-dimensional object, the electronic device 101 (for example, the processor 210 of FIG. 2) may maintain the locked state of the electronic device 101 in operation 1017.

Figure 11:
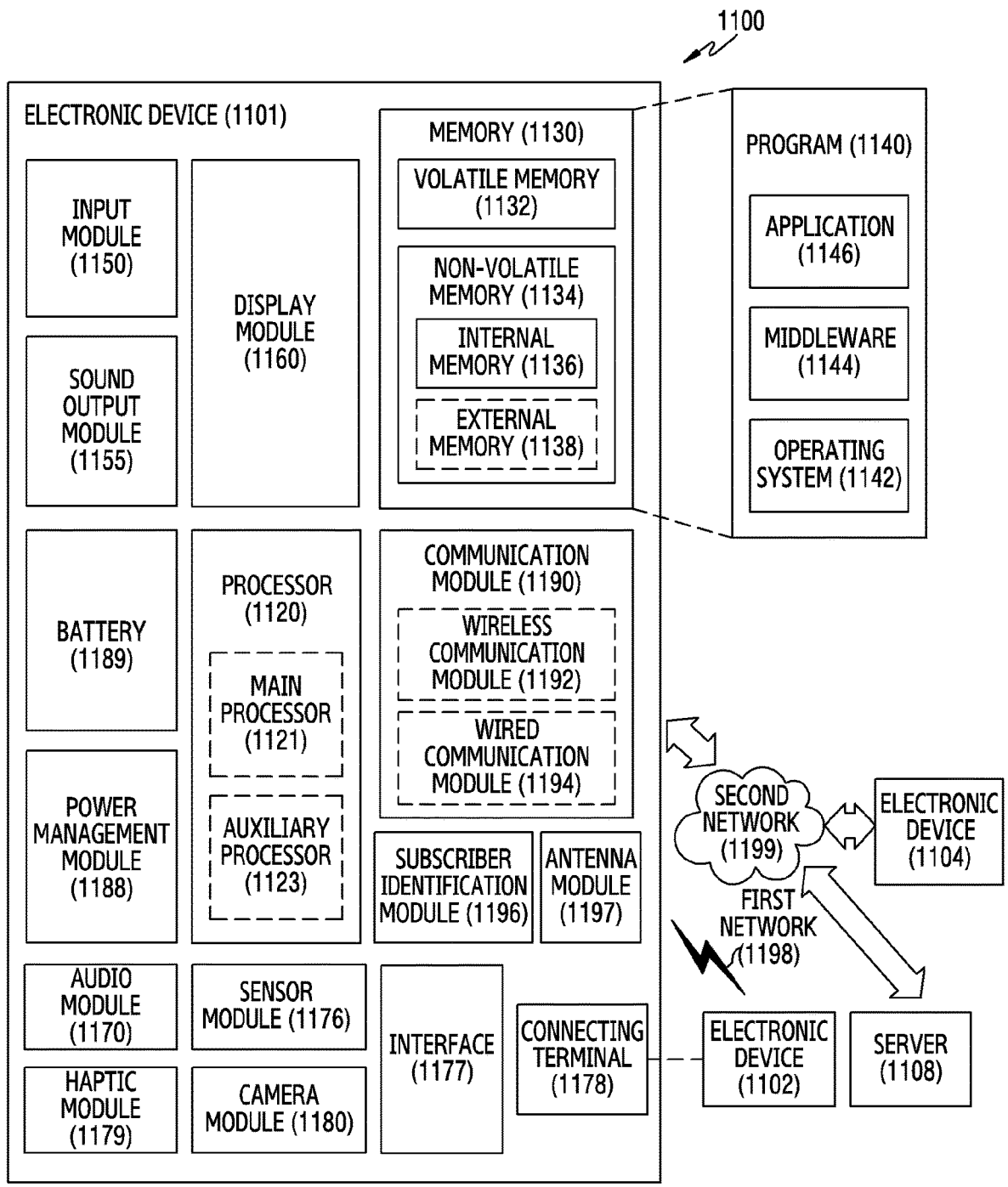
FIG. 11 is a block diagram of an electronic device in a network environment according to various embodiments.

FIG. 11 is a block diagram illustrating an electronic device 1101 in a network environment 1100 according to various embodiments.

Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101. The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smal (phone), a computer device, a portable multimedia device, a portable medical device, a camera, a wearable device, or a home appliance. According to an embodiment of the disclosure, the electronic devices are not limited to those described above. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device may include: a display panel including a plurality of light-emitting elements and a fingerprint sensing region; a fingerprint sensor disposed below the fingerprint sensing region of the display panel; and at least one processor electrically connected with the display panel or the fingerprint sensor, and the at least one processor may: identify an occurrence of an event that causes an operation of receiving a fingerprint through the fingerprint sensor to be executed; acquire a first image of the fingerprint by controlling the display panel such that light-emitting elements disposed in a first light-emitting region within the fingerprint sensing region among the plurality of light-emitting elements output light; acquire a second image of the fingerprint by controlling the display panel such that light-emitting elements disposed in a second light-emitting region that does not overlap the first light-emitting region among the plurality of light-emitting elements output light; and determine whether the fingerprint is a three-dimensional object by using the first image and the second image.

According to an embodiment, the at least one processor may determine whether the fingerprint is the three-dimensional object based on a subtraction component of the first image from the second image.

According to an embodiment, based on determination that the fingerprint is the three-dimensional object, the at least one processor may perform biometric authentication by using a fingerprint image that is acquired based on the first image and the second image.

According to an embodiment, the light outputted from the first light-emitting region may be discharged through a first light output region and an overlapping region which correspond to a surface of the display panel, and the light outputted from the second light-emitting region may be discharged through a second light output region that is distinguished from the first light output region, and the overlapping region, where the second light output region and the overlapping region may correspond to the surface of the display panel.

According to an embodiment, the first image may include a first sensing region corresponding to the first light output region, a second sensing region corresponding to the overlapping region, and a third sensing region corresponding to the second light output region.

According to an embodiment, the at least one processor may filter a noise of the second image based on image data included in the third sensing region of the first image.

According to an embodiment, the at least one processor may: acquire a third image of the fingerprint by controlling light-emitting elements disposed in a third light-emitting region that is distinguished from the first light-emitting region to output light, in response to an occurrence of another event that causes the operation of receiving the fingerprint to be executed after the occurrence of the event; and acquire a fourth image of the fingerprint by controlling light-emitting elements disposed in a fourth light-emitting region that is distinguished from the second light-emitting region and does not overlap the third light-emitting region to output light.

According to an embodiment, the at least one processor may: determine whether the event is a first event of a high security level in response to identifying the occurrence of the event; when the event is the first event of the high security level, may acquire the first image and the second image in sequence by activating the first light-emitting region and the second light-emitting region in sequence, may determine whether the fingerprint is the three-dimensional object by using the first image and the second image, and, when the fingerprint is the three-dimensional object, may perform biometric authentication by using an image of the fingerprint that is acquired by using the first image and the second image, where the event corresponds to a higher security level than a pre-set security level, the processor may determine that the event is the first event of the high security level.

According to an embodiment, when the event is a second event of a low security level, the at least one processor may acquire the image of the fingerprint by controlling light-emitting elements corresponding to the fingerprint sensing region to emit light, where the event corresponds to a lower security level than the pre-set security level, the processor may determine that the event is the second event of the low security level.

According to an embodiment, the at least one processor may control the display panel to output light having the same luminance through the first light-emitting region and the second light-emitting region.

According to various embodiments, an operating method of an electronic device including a display panel including a plurality of light-emitting elements and a fingerprint sensing region, and a fingerprint sensor may include: identifying an occurrence of an event that causes an operation of receiving a fingerprint through the fingerprint sensor to be executed; acquiring a first image of the fingerprint by controlling the display panel such that light-emitting elements disposed in a first light-emitting region within the fingerprint sensing region among the plurality of light-emitting elements output light; acquiring a second image of the fingerprint by controlling the display panel such that light-emitting elements disposed in a second light-emitting region that does not overlap the first light-emitting region among the plurality of light-emitting elements output light; and determining whether the fingerprint is a three-dimensional object by using the first image and the second image.

According to an embodiment, the determining whether the fingerprint is the three-dimensional object of the method may include determining whether the fingerprint is the three-dimensional object based on a subtraction component of the first image from the second image.

According to an embodiment, the method may further include, based on determination that the fingerprint is the three-dimensional object, performing biometric authentication by using an image of the fingerprint that is acquired based on the first image and the second image.

According to an embodiment, acquiring the first image of the fingerprint by controlling the display panel, such that the light-emitting elements disposed in the first light-emitting region within the fingerprint sensing region among the plurality of light-emitting elements output light, may include discharging light outputted by the light-emitting elements disposed in the first light-emitting region through a first light output region and an overlapping region which correspond to a surface of the display panel, and acquiring the second image of the fingerprint by controlling the display panel, such that the light-emitting elements disposed in the second light-emitting region that does not overlap the first light-emitting region among the plurality of light-emitting elements output light, may include discharging light outputted by the light-emitting elements disposed in the second light-emitting region through a second light output region that is distinguished from the first light output region, and the overlapping region, where the second light output region and the overlapping region may correspond to the surface of the display panel.

According to an embodiment, the method may further include controlling the first image to include a first sensing region corresponding to the first light output region, a second sensing region corresponding to the overlapping region, and a third sensing region corresponding to the second light output region.

According to an embodiment, the method may include filtering a noise of the second image based on image data included in the third sensing region of the first image.

According to an embodiment, the method may further include: acquiring a third image of the fingerprint by controlling light-emitting elements disposed in a third light-emitting region that is distinguished from the first light-emitting region to output light, in response to an occurrence of another event that causes the operation of receiving the fingerprint to be executed after the occurrence of the event; and acquiring a fourth image of the fingerprint by controlling light-emitting elements disposed in a fourth light-emitting region that is distinguished from the second light-emitting region and does not overlap the third light-emitting region to output light.

According to an embodiment, the method may include: determining whether the event is a first event of a high security level in response to identifying the occurrence of the event; when the event is the first event of the high security level, acquiring the first image and the second image in sequence by activating the first light-emitting region and the second light-emitting region in sequence; determining whether the fingerprint is a three-dimensional object by using the first image and the second image, and, based on a result of determining whether the fingerprint is the three-dimensional object, performing biometric authentication by using an image of the fingerprint that is acquired by using the first image and the second image.

According to an embodiment, the method may include, when the event is a second event of a low security level, acquiring the image of the fingerprint by controlling light-emitting elements corresponding to the fingerprint sensing region to emit light.

According to an embodiment, the method may include controlling the display panel to output light having the same luminance through the first light-emitting region and the second light-emitting region.

What is claimed is:

1. An electronic device comprising:
   a display panel comprising a plurality of light-emitting elements and a fingerprint sensing region;
   a fingerprint sensor disposed below the fingerprint sensing region of the display panel;
   memory storing instructions; and
   at least one processor,
   wherein the instructions, when executed by the at least one processor, cause the electronic device to:
   identify an occurrence of an event that causes an operation of receiving a fingerprint through the fingerprint sensor to be executed;
   acquire a first image of the fingerprint by controlling the display panel such that light-emitting elements disposed in a first light-emitting region within the fingerprint sensing region among the plurality of light-emitting elements output light;
   acquire a second image of the fingerprint by controlling the display panel such that light-emitting elements disposed in a second light-emitting region that does not overlap the first light-emitting region among the plurality of light-emitting elements output light; and
   determine whether the fingerprint is a three-dimensional object by using the first image and the second image,
   wherein the instructions, when executed by the at least one processor, cause the electronic device to determine that the fingerprint is the three-dimensional object when a phase of a first portion among the first image is different from a phase of a second portion among the second image, and
   wherein the first portion of the first image and the second portion of the second image correspond to a same portion of the fingerprint.

2. The electronic device of claim 1, wherein the instructions, when executed by the at least one processor, cause the electronic device to determine whether the fingerprint is the three-dimensional object based on a subtraction component of the first image from the second image.

3. The electronic device of claim 1, wherein, based on determination that the fingerprint is the three-dimensional object, the instructions, when executed by the at least one processor, cause the electronic device to perform biometric authentication by using a fingerprint image that is acquired based on the first image and the second image.

4. The electronic device of claim 1, wherein the light outputted from the first light-emitting region is discharged through a first light output region and an overlapping region which correspond to a surface of the display panel, and the light outputted from the second light-emitting region is discharged through a second light output region that is distinguished from the first light output region, and the overlapping region,
wherein the second light output region and the overlapping region correspond to the surface of the display panel.

5. The electronic device of claim 4, wherein the first image comprises a first sensing region corresponding to the first light output region, a second sensing region corresponding to the overlapping region, and a third sensing region corresponding to the second light output region.

6. The electronic device of claim 5, wherein the instructions, when executed by the at least one processor, cause the electronic device to filter a noise of the second image based on image data included in the third sensing region of the first image.

7. The electronic device of claim 1, wherein the instructions, when executed by the at least one processor, cause the electronic device to:
acquire a third image of the fingerprint by controlling light-emitting elements disposed in a third light-emitting region that is distinguished from the first light-emitting region to output light, in response to an occurrence of another event that causes the operation of receiving the fingerprint to be executed after the occurrence of the event; and
acquire a fourth image of the fingerprint by controlling light-emitting elements disposed in a fourth light-emitting region that is distinguished from the second light-emitting region and does not overlap the third light-emitting region to output light.

8. The electronic device of claim 1, wherein the instructions, when executed by the at least one processor, cause the electronic device to:
determine whether the event is a first event of a high security level in response to identifying the occurrence of the event;
when the event is the first event of the high security level, acquire the first image and the second image in sequence by activating the first light-emitting region and the second light-emitting region in sequence, determine whether the fingerprint is the three-dimensional object by using the first image and the second image, and, when the fingerprint is the three-dimensional object, perform biometric authentication by using an image of the fingerprint that is acquired by using the first image and the second image,
wherein the event corresponds to a higher security level than a pre-set security level, the instructions, when executed by the at least one processor, cause the electronic device to determines that the event is the first event of the high security level.

9. The electronic device of claim 8, wherein, when the event is a second event of a low security level, the at least one processor is configured to acquire the image of the fingerprint by controlling light-emitting elements corresponding to the fingerprint sensing region to emit light,
wherein the event corresponds to a lower security level than the pre-set security level, the instructions, when executed by the at least one processor, cause the electronic device to determines that the event is the second event of the low security level.

10. The electronic device of claim 1, wherein the instructions, when executed by the at least one processor, cause the electronic device to control the display panel to output light having a same luminance through the first light-emitting region and the second light-emitting region.

11. An operating method of an electronic device comprising a display panel comprising a plurality of light-emitting elements and a fingerprint sensing region, and a fingerprint sensor, the operating method comprising:
identifying an occurrence of an event that causes an operation of receiving a fingerprint through the fingerprint sensor to be executed;
acquiring a first image of the fingerprint by controlling the display panel such that light-emitting elements disposed in a first light-emitting region within the fingerprint sensing region among the plurality of light-emitting elements output light;
acquiring a second image of the fingerprint by controlling the display panel such that light-emitting elements disposed in a second light-emitting region that does not overlap the first light-emitting region among the plurality of light-emitting elements output light;
determining whether the fingerprint is a three-dimensional object by using the first image and the second image; and
determining that the fingerprint is the three-dimensional object when a phase of a first portion among the first image is different from a phase of a second portion among the second image, and
wherein the first portion of the first image and the second portion of the second image correspond to a same portion of the fingerprint.

12. The method of claim 11, wherein the determining whether the fingerprint is the three-dimensional object comprises determining whether the fingerprint is the three-dimensional object based on a subtraction component of the first image from the second image.

13. The method of claim 11, further comprising:
based on determination that the fingerprint is the three-dimensional object, performing biometric authentication by using an image of the fingerprint that is acquired based on the first image and the second image.

14. The method of claim 11, wherein acquiring the first image of the fingerprint by controlling the display panel comprises discharging the light outputted by the light-emitting elements disposed in the first light-emitting region through a first light output region and an overlapping region which correspond to a surface of the display panel, and
acquiring the second image of the fingerprint by controlling the display panel comprises discharging the light outputted by the light-emitting elements disposed in the second light-emitting region through a second light output region that is distinguished from the first light output region, and the overlapping region,
wherein the second light output region and the overlapping region correspond to the surface of the display panel.

15. The method of claim 11, further comprising:
acquiring a third image of the fingerprint by controlling light-emitting elements disposed in a third light-emitting region that is distinguished from the first light-emitting region to output light, in response to an occurrence of another event that causes the operation of receiving the fingerprint to be executed after the occurrence of the event; and
acquiring a fourth image of the fingerprint by controlling light-emitting elements disposed in a fourth light-emitting region that is distinguished from the second light-emitting region and does not overlap the third light-emitting region to output light.

16. The electronic device of claim 2, wherein the instructions, when executed by the at least one processor, cause the electronic device to determines that the fingerprint is the three-dimensional object when the subtraction component includes a phase difference in a predetermined area, of which value is not zero.

* * * * *